(12) United States Patent
Soman et al.

(10) Patent No.: US 10,635,466 B2
(45) Date of Patent: *Apr. 28, 2020

(54) ENHANCED SECURITY USING REMOTE APPLICATIONS (71) Applicant: VMware, Inc., Palo Alto, CA (US)

(72) Inventors: Sisimon Soman, Sunnyvale, CA (US); Matthew Conover, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/373,736

(22) Filed: Dec. 9, 2016

(65) Prior Publication Data

US 2018/0165447 A1 Jun. 14, 2018

(51) Int. Cl.
*H04L 29/06* (2006.01)
*G06F 9/455* (2018.01)
*G06F 21/62* (2013.01)

(52) U.S. Cl.
CPC ...... *G06F 9/45508* (2013.01); *G06F 9/45558* (2013.01); *G06F 21/6218* (2013.01); *G06F 2009/45587* (2013.01)

(58) Field of Classification Search
CPC . G06F 21/53; G06F 9/45558; G06F 2221/033
USPC ......................................................... 726/22
See application file for complete search history.

(56) References Cited

U.S. PATENT DOCUMENTS

2008/0109679 A1* 5/2008 Wright ................. H04L 63/102
714/37
2015/0058286 A1* 2/2015 Leibovici ............. G06F 16/178
707/610

* cited by examiner

*Primary Examiner* — Evans Desrosiers (57) ABSTRACT

Described herein are systems, methods, and software to provide enhanced security when opening applications. In one implementation, an application service receives, over a network, an application request from an end user device to support a file open request on the end user device, wherein the application request occurs based on a security status of a file associated with the file open request. The application service further allocates a virtual node with an application to the end user device to support the application request, provides a remote connection for the application to the end user device, and opens the file in the application of the virtual node to support the file open request.

13 Claims, 9 Drawing Sheets

| URL ZONES 510 | SECURITY VALUES 520 | INTERNAL OR REMOTE APPLICATION ID 530 |
|---|---|---|
| LOCAL ZONE 511 | 0 | INTERNAL APPLICATION |
| INTRANET ZONE 512 | 1 | |
| TRUSTED ZONE 513 | 2 | |
| INTERNET ZONE 514 | 3 | REMOTE APPLICATION |
| UNTRUSTED ZONE 515 | 4 | |

ENHANCED SECURITY USING REMOTE APPLICATIONS

BACKGROUND

Internet browsers are software applications for retrieving, presenting, and traversing information resources on the World Wide Web. These information resources are identified by uniform resource identifiers or locators (URIs/URLs) and may comprise a web page, an image, a video, or some other piece of content. Internet browsers may further be used to access information provided by web servers in private networks or files in file systems. To provide the content, a request may be generated by the browser to a server that hosts the requested content. In response to the request, the server may provide the content to the browser, which in turn presents the content to the end user.

Downloaded files from the Internet can present a security risk to the users of an end user computing system. In particular, the downloaded content may include malware, viruses, spyware, and other types of software and processes that are undesirable on the end user device. These processes may commandeer processing on the computing system, track the user during operation of the computing system, or provide some other malicious operation on the computing system. As a result, it is often desirable to manage the downloads of new files to the computing system to ensure or limit the risk presented to the end user device.

Overview

The technology disclosed herein enhances the management of file open requests on end user devices. In one implementation, a method of providing remote applications based on file open requests includes, in an application service, receiving, over a network, an application request from an end user device to support a file open request on the end user device, wherein the application request occurs based on a security status of a file associated with the file open request. The method further provides allocating a virtual node with an application to the end user device to support the application request, providing a remote connection for the application to the end user device, and opening the file in the application of the virtual node to support the file open request.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for managing security of end user computing devices. In particular, end user computing devices often include software applications for the opening and manipulation of various files on the end user computing device. These applications may include productivity applications, such as word processing applications, spreadsheet applications, and the like, media editing applications, such as video or image editing applications, or some other type of application. To use the files with the applications, users may generate new files locally, or retrieve the files from remote sources, such as the internet or a file server. Once retrieved, the user may initiate an open operation on the file to open the file with the appropriate application. For example, the user may download a Portable Document Format (PDF) file from the internet, and initiate an open operation on a PDF file to open the file with a reader application, such Adobe Acrobat.

In the present example, to manage the security of new files at an end user device, an application service is provided that enables the end user device to request and receive remote connections to applications executing on separate host computing systems. In one implementation, a request driver or service may execute on the local end user device to monitor file open operations. When a file is identified as a possible security risk, which may be based on the source of the file, the file type extension associated with the file, or some other security attribute, the driver or service may transfer a request to the application service to receive a remote connection to an application associated with the file type. Once requested and the application service supplies the remote connection to a virtual node (a virtual machine or container) with the remote application, the end user device may map at least the required file to be opened by the remote application. This mapping of the file may include providing a network path for the file to be opened in the remote application, wherein the path may include an internet protocol address, directory, and any other path information associated with the remote application. For local files, this mapping may permit at least a portion of the file to be transferred from the end user device to the virtual node to be opened by the remote application. Similarly, the mapping may permit at least a portion of the file on a file server to be transferred to the remote application (in some examples through the end user device) to the virtual node to be opened by the remote application. By providing the mapping, rather than using a local application, the end user device may rely on the remotely executing application to provide security on the end user device.

Figure 1:
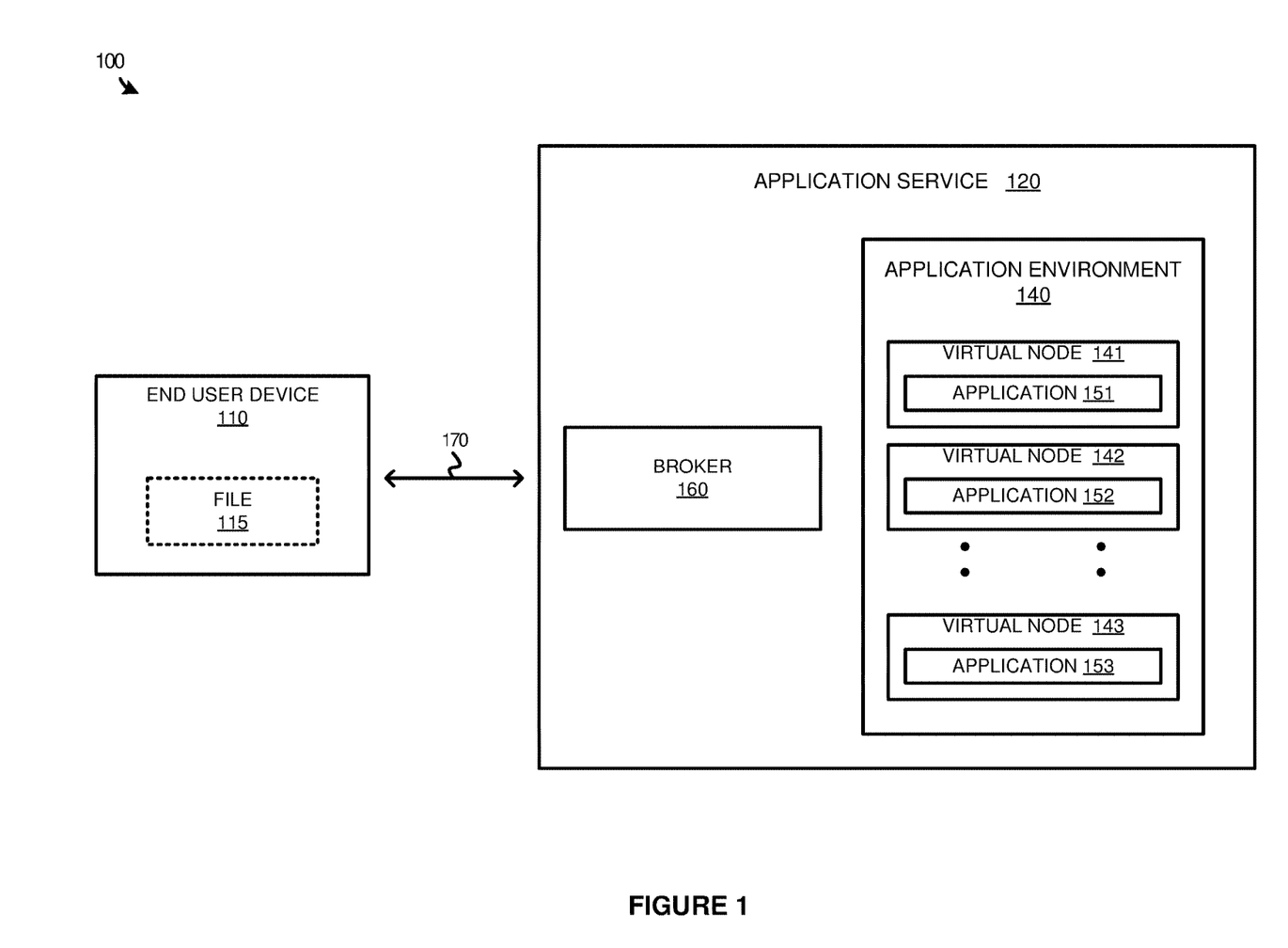
FIG. 1 illustrates a computing environment for enhanced end user computing security using remote applications according to an implementation.

To further demonstrate the operations with respect to an application service, FIG. 1 is provided. FIG. 1 illustrates a computing environment 100 for enhanced end user computing security using remote applications according to an implementation. Computing environment 100 includes end user device 110 and application service 120. End user device 110 includes access to file 115, which may comprise a file from the internet, a file from an attached device, such as from a universal serial bus (USB) device, a file stored on local storage, or some other file for end user device 110. Application service 120 further includes broker 160 and application environment 140, which is used to execute virtual nodes 141-143. Application service 120 may execute in a private cloud environment or in public cloud environment in some examples, wherein virtual nodes 141-143 are provided as virtual machines or containers. End user device 110 communicates with application service 120 via communication link 170. Although illustrated with a single end user device in communication with application service 120, it should be understood that any number of devices may be in communication with the application service.

In operation, application service 120, which may include one or more host computing systems, executes virtual nodes 141-143 with applications 151-153. Applications 151-153 may comprise various applications for productivity, media editing, reading, or some other similar application. In some examples, virtual nodes 141-143 may comprise full operating system virtual machines, which abstract the physical components of the host computing system. In other implementations, virtual nodes 141-143 may comprise virtual containers, wherein the containers may include Docker containers, Linux containers, Windows containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host, the containers are provisioned to have private access to the operating system with their own identifier space, file system structure, and network interfaces.

To access the applications, end user device 110 may include a driver or service that monitors file open requests on the device. In particular, the driver may identify a file open request, determine whether the file can be opened via a local application based at least on a security status for the file, and if the file cannot be opened locally, transfer a request to application service 120 to receive a remote application to support the file open request. In response to the request, application service 120 identifies an application and virtual node to support the request, and provides a remote connection for the virtual node to the end user device, wherein the remote connection permits user input/output at the end user device 110, while the application is executing via the remote host.

Figure 2:
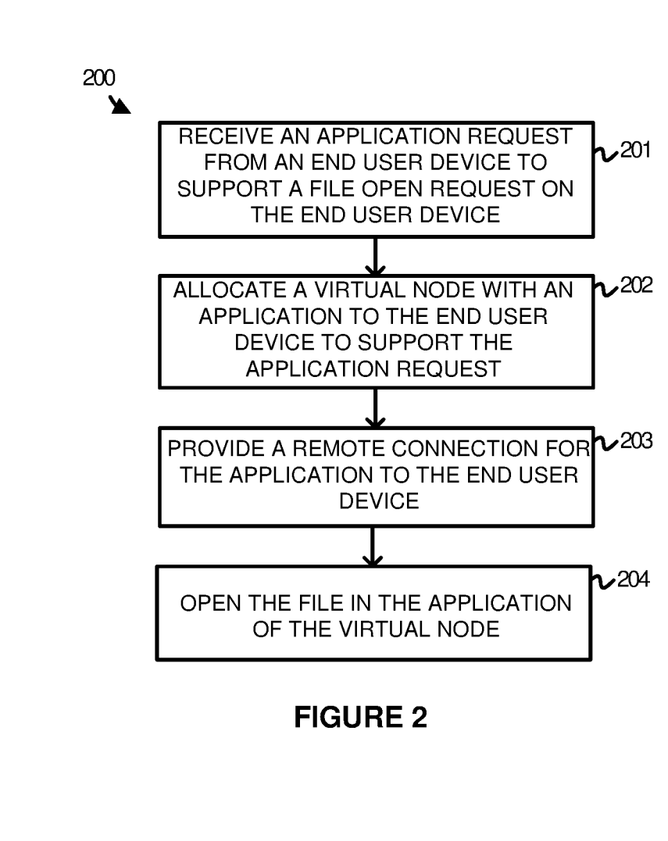
FIG. 2 illustrates a method of operating an application service to provide remote applications to end user devices according to an implementation.

Referring now to FIG. 2, FIG. 2 illustrates a method of operating an application service to provide remote applications to end user devices according to an implementation. The operations of FIG. 2 are referenced parenthetically in the paragraphs that follow with reference to systems and elements of computing environment 100 of FIG. 1.

As described herein, application service 120 may include one or more host computing systems that are used to provide a platform for virtual nodes 141-143. To provide the virtual nodes to requesting end user devices, application service 120, at broker 160, receives (201) an application request from an end user device 110 to support a file open request on the end user device, wherein the request is generated based on a security status for a file associated with the file open request. This security status may be based on the file type (extension) of the file and/or the source of the file. In one example, all PDF files downloaded from the internet may be deemed a security risk. According, a request may be generated to receive a remote application to support the file open request. In contrast, image files that are downloaded or provided from any source may be deemed to not provide a security risk. Consequently, the image files may be opened locally via an application on the end user device. In response to the request, application service 160 allocates a virtual node with an application to end user device 110 to support the application request (202). In some implementations, the allocation may include allocating an idle virtual node that is not currently allocated to any other end user device. In other implementations, a new virtual node may be initiated to accommodate the request. For example, application service 120 may initiate a new container image to support the request, or initiate a startup or wake operation on a virtual machine to support the request.

Once the virtual node is allocated to the request, application service 120 may provide (203) a remote connection for the application to the end user device. In providing the remote connection, application service 120 may provide user input/output information to end user device 110, wherein end user device 110 may use the information to provide a display of the required application and receive user input to interact with the application. In some implementations, in providing the remote application to end user device 110, the application may be presented on the local device as though the application were locally executing on the end user device. Once the remote connection is provided to the application, application service 120 further opens (204) the file in the application of the virtual node. In some implementations, this opening of the file may be the result of a mapping by the end user device of at least the file to the application operating on the remote host.

Referring to an example of FIG. 1, in response to a request from end user device 110, broker 160 may be used to allocate a virtual node in virtual nodes 141-143. In determining the node, the request from end user device 110 may request a particular application for the file, or may include an identifier for the file type, wherein broker 160 may identify an application to support the file type. Once the application is identified, broker 160 may determine a node that is capable of executing the particular application to support the request. After allocating the node, application service 120 may provide addressing and security information to end user device 110 to establish a remote connection to the node, permitting end user device 110 to open the file in the provided application.

Figure 3:
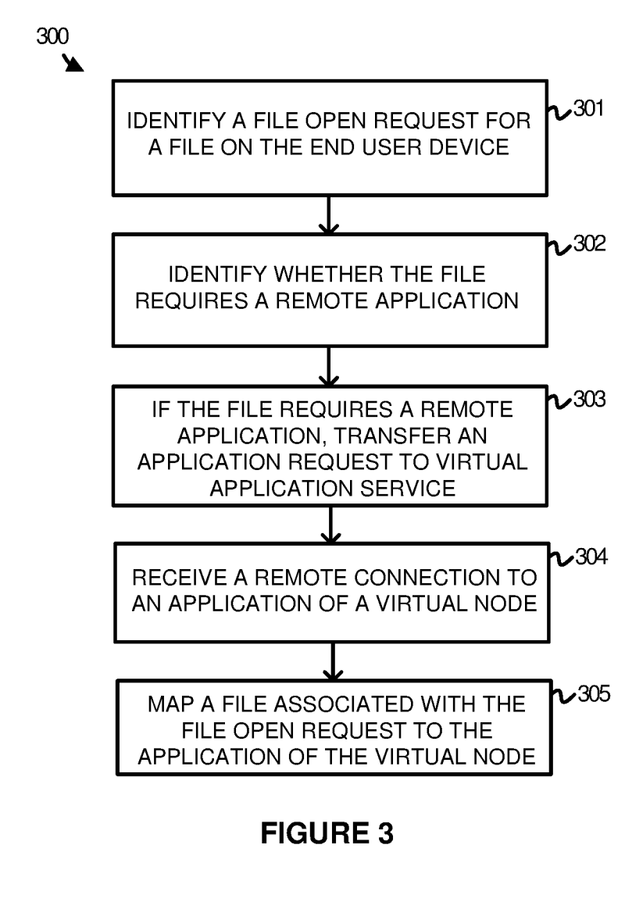
FIG. 3 illustrates a method of operating an end user device to request remote applications according to an implementation.

FIG. 3 illustrates a method of operating an end user device to request remote applications according to an implementation. The operations of FIG. 3 are referenced parenthetically in the paragraphs that follow with reference to systems and elements of computing environment 100 of FIG. 1.

As depicted in FIG. 3, an end user device may identify (301) a file open request for a file on the end user device. In response to the file open request, the end user device may identify (302) whether the file requires a remote application.

To make this determination, end user device 110 may include a driver or process that determines various attributes for the file to determine whether the file may be processed via a local application or via a remote application. These attributes, which may be used to determine a security status for the file, may include the file type, the source of the file, or some other type of information. For example, during a file open request, the process may determine whether the file was generated locally on the device, retrieved from the intranet, retrieved from a trusted location (i.e. trusted server), downloaded from the internet, or received from an untrusted location (i.e. untrusted server). Based on the determination, which may be determined based on the data stream associated with the file, the process may request a remote application to service the request.

After determining whether the file requires the remote application based on the security status of the file, the method further provides, if the file requires a remote application, transferring (303) an application request to application service 120. In some implementations, the request to application service 120 may include an identifier for the required application, such as an application name or another similar identifier. In other implementations, the request may indicate a file type that is requested to be opened at end user device 110. Based on the file type, application service 120 may determine the type of application that is required for the file type and allocate a virtual node to service the request.

Once the request is transferred to application service 120, end user device 110 receives (304) a remote connection to an application of a virtual node. This remote connection permits input and output data to be exchanged between the allocated application and end user device 110, wherein end user device 110 may display a visual representation of the application and receive input from a user of the application to interact with the application. Further, end user device 110 may map (305) a file associated with the file open request to the application of the virtual node. Referring to the example in FIG. 1, end user device 110 may map a file path to the application supplied via the virtual node from application service 120. In some examples, this may include providing a file open path including an application name, file path, IP address, or any other similar information to be used in providing the path of file 115 to the associated application. In some implementations, end user device 110 may use file type association (FTA), such that future files with similar attributes may be opened by the same application. This FTA may associate the application with files of the same file type, with files of the same-file type and source location, or some other FTA determination.

Figure 4A:
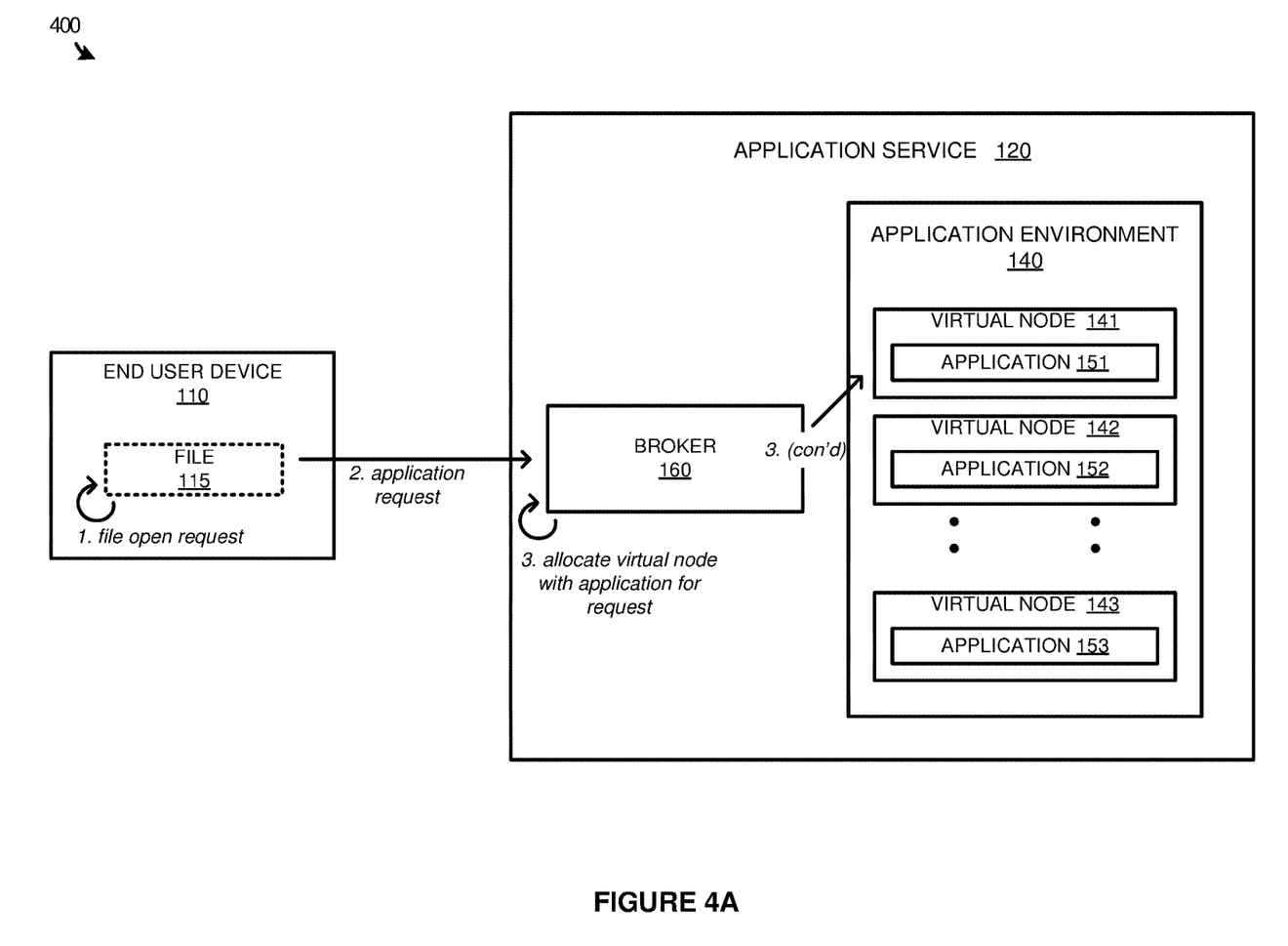
FIGS. 4A-4B illustrate an operational scenario of allocating a remote application to an end user device according to an implementation.
Figure 4B:
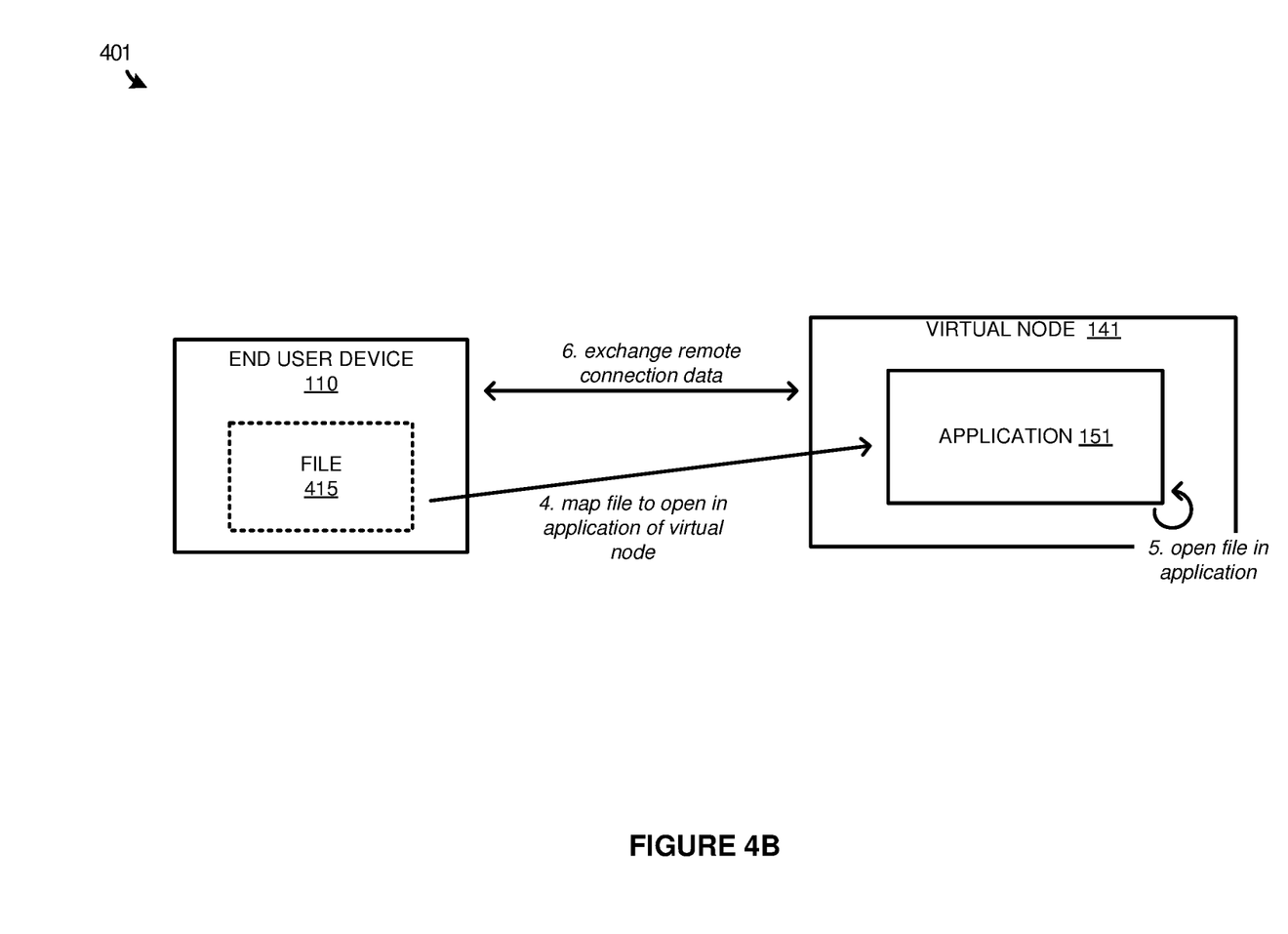

FIGS. 4A-4B illustrate an operational scenario of allocating a remote application to an end user device according to an implementation. The operations of FIG. 4 are referenced parenthetically in the paragraphs that follow with reference to systems and elements of computing environment 100 of FIG. 1.

Referring first to FIG. 4A, the operation begins, at step 1, by identifying a file open request for file 115 on end user device 110. File 115 may comprise a text document, a spreadsheet document, an image file, a movie, or some other similar type of file. In response to the file open request, end user device 110 determines whether the file open request qualifies for an external or remote application to be provided via application service 120. This determination may be made based on the security status of the file, which may be determined from the file type (file extension) associated with the file and/or the source of the file in relation to end user device 115. In the present example of FIG. 4A, end user device 110 determines that the file requires the use of an external application and transfers, at step 2, an application request to broker 160 of application service 120. In response to the request, broker 160 allocates, at step 3, a virtual node 141 with an application 151 to support the request. To allocate the virtual node, broker 160 may, in some examples, allocate an idle virtual node that is not currently allocated for use with an end user device. In other examples, broker 160 may initiate or start a new virtual node to accommodate the request from end user device 110.

In some implementations, in allocating the request, broker 160 may identify a requested application identifier from the application request, wherein the identifier indicates a particular application required to support the request. Once identified, broker 160 may identify an available virtual node with the required application, and may allocate the virtual node to end user device 110 and file 115. In other implementations, in allocating the virtual node, broker 160 may identify a file type identifier in the request. Once identified, broker 160 may identify an application capable of supporting the file type and identify an available virtual node with the identified application.

Turning to FIG. 4B, once the virtual node is allocated with the required application, which may comprise a virtual machine or a container, end user device 110 may map, at step 4, file 415 to open in application 151 of virtual node 141. In some examples, to map the file, the application service may provide remote connection information to end user device 110, permitting end user device 110 to remotely access application 151. This remote connection information may include addressing information, such as IP address information and file path information, and security information for accessing the particular virtual node. Once the remote connection information is provided, end user device 110 may use the path information to map file 415 to application 151. For example, file 415 may be mapped to open with an application at "http://NETWORK_ADDRESS_141/programs/APPLICATION_151", where NETWORK_ADDRESS_141 comprises the network address for virtual node 141, and the remaining portion of the address directs to application 151 on the virtual node.

In some implementations, in addition to mapping file 415, end user device 110 may map additional files to application 151 using FTA. These additional files may include files of the same file type or files of the same file type with a similar file source. For example, all text documents from an untrusted server source may be configured to open from the same application operating in the application service.

Once file 415 is mapped to application 151, end user device 110 may supply the mapped file to virtual node 141, wherein the file may be opened, at step 5, with application 151. Once opened, end user device 110 may exchange, at step 6, remote connection data with virtual node 141 to provide the required operations associated with the file. In the case of a local file associated with the file open request (such as that illustrated in FIGS. 4A and 4B), at least a portion of the local file may be transferred from the end user device to the virtual node to be opened using the remote application. Similarly, in the case of a file open request for a file on a remote server, the file may be directed to the virtual node to be opened by the virtual node, wherein the file may be passed through the end user device to the virtual node, but not opened in an application on the end user device.

As an illustrative example, if file 415 were a text document, a text edit application may be allocated in virtual node 141. Once allocated, end user device 110 may map file 415 to open in application 151 to provide the desired operations on the file. After opening, virtual node 141 may provide a visual representation of the application with the file to be displayed on end user device 110. Further, end user device 110 may be configured to receive user input for the application and provide the user input to remotely executing application 151. Additionally, because of the mapping, any modifications to be saved for the file may be stored locally on end user device 110.

Figure 5:
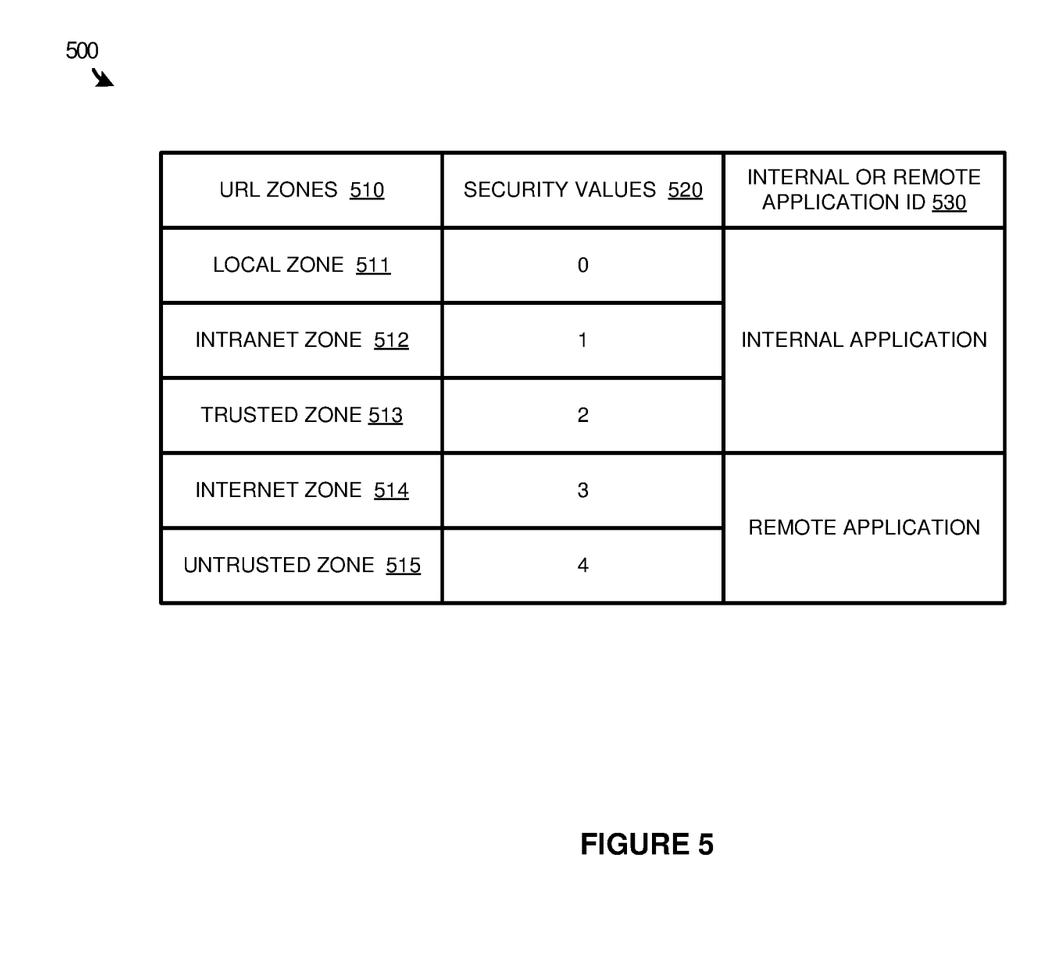
FIG. 5 illustrates a data structure to manage requests to remote applications according to an implementation.

FIG. 5 illustrates a data structure 500 to manage requests to remote applications according to an implementation. Data structure 500 includes uniform resource locator zones 510 with zones 511-515, security values 520, and internal or remote application identifier (ID) 530. Although illustrated as a single table in the present example, it should be understood that one or more tables, data trees, linked lists, or some other data structure may be used in managing the requests for remote application. Additionally, while illustrated in the present example as using URL zones to identify when to trigger remote applications, it should be understood that any other attribute of a file may be used to trigger a request for an external application.

As described herein, when a file open request is identified at an end user device, the end user device may make a determination whether the file should be opened in a local application or an application provided by an external service. To make this determination, a process, executing on the end user device, may identify various attributes of the file and determine whether the attributes meet security criteria for requesting the external application. Here, the attribute for determining whether an external application should be used is the source URL zone for the file. In particular, the zones include local zone 511, corresponding to file originating on the device, intranet zone 512, corresponding to files from devices on the intranet, trusted zone 513, corresponding to files from trusted devices or servers, internet zone 514, corresponding to downloads from the internet, and untrusted zones 515 corresponding to untrusted devices and servers as the source of the file. Although illustrated with five different sources for a file, it should be understood that the sources may be separated by larger and smaller granularity.

To identify the source of the file, an alternate data stream (ADS) associated with the file may be used, wherein the ADS includes a zone identifier for the source of the file. As a result, when a file open request is detected, the end user device may extract the source information from the ADS to determine where the file should be opened. Here, if the file is determined to originate from zones 511-513 with security values zero through two, then the file may be opened via a locally executing application for the end user device. In contrast, if the file is determined to originate from zones 514-515, with security values three and four, then the file is directed to be opened via a remote application, and a remote application request will be transferred to the application service.

In some examples, each end user device that uses the application service may have different rules or settings for when to trigger a remote application request. For example, a first end user device may require enhanced security and may limit opening files via local applications to local zone 511. In contrast, an end user device with lower security requirements may permit the opening of files from zones 511-514 on the local device. Further, while illustrated in the present example of using the source of the file to determine when to trigger the remote application, it should be understood that file type may be used in addition to or in place of the source of the file. For example, all spreadsheet documents may be required to be opened via a remote application.

Figure 6A:
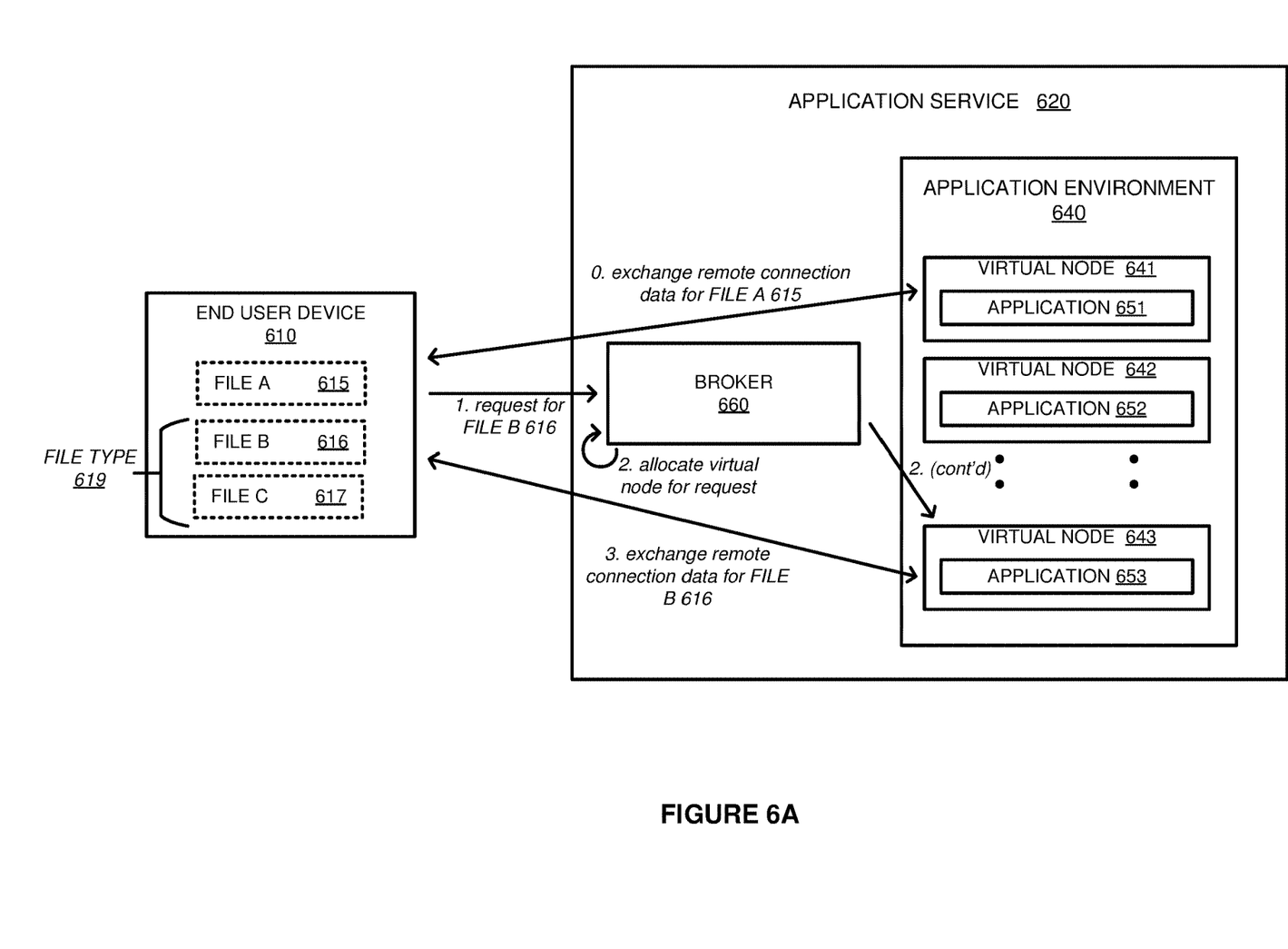
FIGS. 6A-6B illustrate an operational scenario of allocating a remote application to an end user device according to an implementation.
Figure 6B:
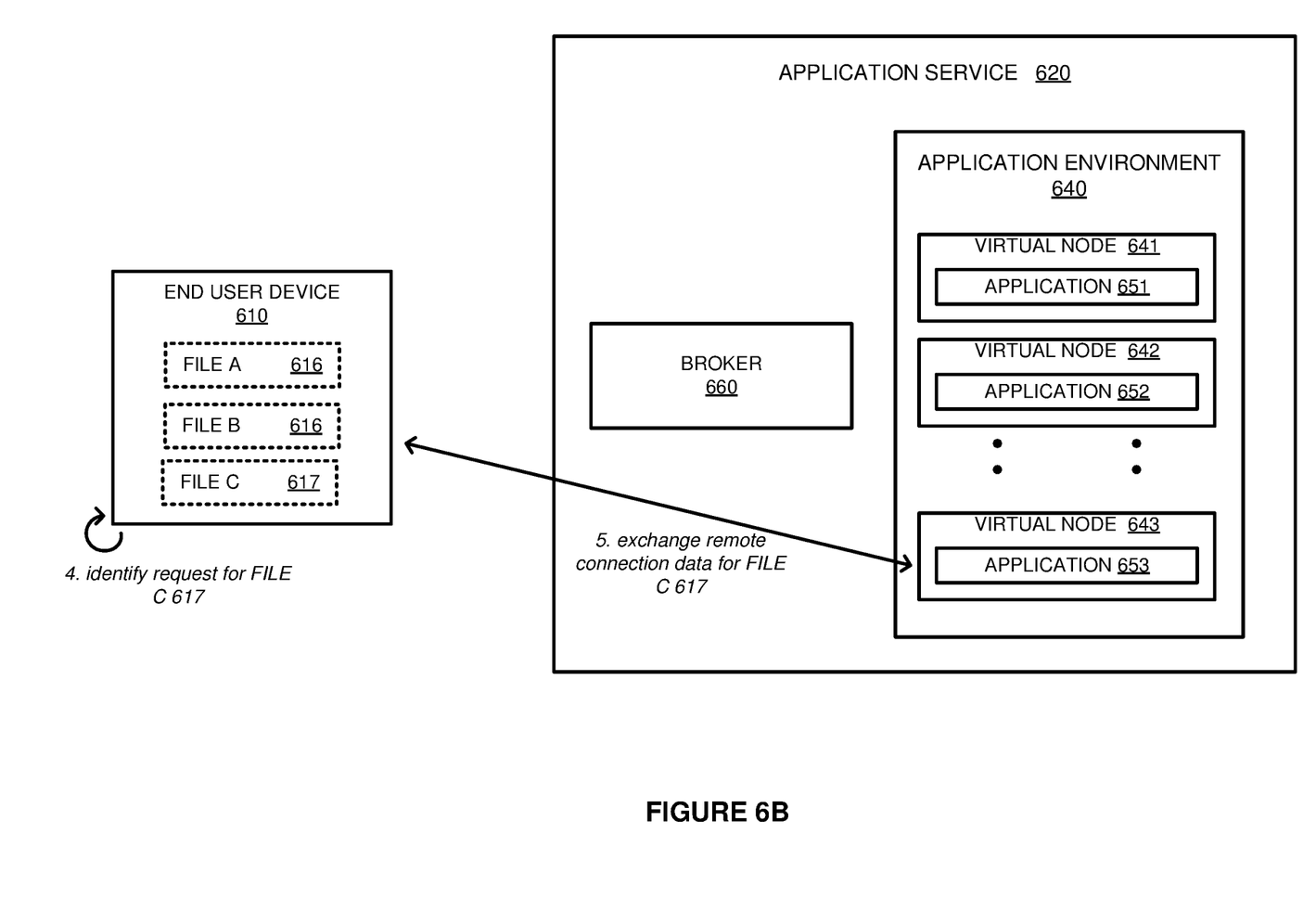

Turning to FIGS. 6A-6B, FIGS. 6A-6B illustrate an operational scenario of allocating a remote application to an end user device according to an implementation. FIGS. 6A-6B include end user device 610 and application service 620. End user device 610 includes files A-C 615-617, which are representative of files opened locally at end user device 610. Files B and C 616-617 share a file type 619, which may comprise a text file type, an image file type, or some other file type. Application service 620 further includes application environment 640 and broker 660, wherein broker 660 is used to allocate virtual nodes 641-643 in application environment 640 to requesting end user devices.

Referring first to FIG. 6A, a file open request has already been initiated for file A 615 on end user device 610 causing virtual node 641 to be allocated to end user device 610 to support the operations on file A 615. Once allocated, end user device 610 may exchange, at step 0, remote connection data for file A 615 and application 651 on virtual node 641. In some implementations, this exchanging may include virtual node 641 providing a user interface for application 651 to be presented on end user device 610, while end user device 610 may receive user input data and provide the user input data to virtual node 641 and application 651.

As end user device 610 exchanges remote connection information with virtual node 641, a second file open request is encountered for file B 616, wherein file B 616 corresponds to a second file type. In response to the request, end user device 610 may determine, based on a security status associated with the file, whether the request should be handled via application service 620. This security status may be based on the file type associated with file B 616 and/or the source of file 616. Here, because the security status for file B 616 qualifies for a remote application, end user device 610 transfers, at step 1, an application request for file B 616 to broker 660.

In response to receiving the request, broker 660 allocates, at step 2, a virtual node 643 to handle operations in association with file B 616. To determine the appropriate virtual node, broker 660 may first determine the required application to support the request. In some examples, the required application may be specified in the request from end user device 610. In other examples, a file type indicator may be provided in the request, wherein the file type indicator may be used by broker 660 in the determination of the application. Once the application is identified, an idle virtual node maybe allocated or a new virtual node may be started with the required application to support the request.

After allocating the virtual node, a remote connection may be provided to end user device 610 permitting, at step 3, the exchange of remote connection data for file B 616. In particular, this exchange of remote connection data may be used to provide a remote user interface for application 653 at end user device 610. In some implementations, this interface may provide a window such that the application appears as though it is locally executing on end user device 610. However, it should be understood that the application may be presented within a remote desktop window, such that the user of end user device 610 may identify that the application is executing in a remote system.

In the present example, in providing the remote connection to end user device 610, end user device 610 is configured to map file B 616 to be opened using application 653. To provide this mapping, application service 620 may provide remote connection information to end user device 610, indicating an access path for application 653. This access path may include an IP address, port number, file path, and any other similar information for directing file open requests to the application. Once the path information is provided, end user device 610 may direct file B 616 to be opened by the remote application using the access path.

Referring now to FIG. 6B, in addition to mapping file B 616 to application 653 on virtual node 643, end user device 610 further uses file type association to ensure that other files opened at end user device 610 are provided to the same application. In particular, file type association may be used to map files of a particular type and, in some examples, source to the same application. For example, if an image is downloaded from the internet, and associated with application 653 in application service 620, then future image downloads from the internet may also be opened with application 653 as the file type will be associated with the path to trigger application 653.

Turning to the example in FIG. 6B, when a file open request is identified for file C 617, at step 4, end user device 610 may map the open request to application 653 because it is the same file type as file B 616. Once mapped and opened with application 653, end user device 610 and virtual node 643 may exchange, at step 5, remote connection data for file C 617. In some implementations, when files B and C 616-617 are opened at the same time, multiple user interface windows may be provided to the end user of end user device 610. For example, if file B and C 616-617 comprises text documents, then two text editing windows may be provided to the user of end user device 610.

Although illustrated in the example of FIGS. 6A and 6B with two files opened with the same application in application service 620, it should be understood that any number of files may be opened with the software application. Further, while illustrating requests for two applications, it should be understood that end user device 610 may request any number of applications from application service 620.

In some implementations, once the user completes operations with a particular file, the remote connection with the application may be terminated. This termination may include removing the mapping of the file to the application in application service 620, removing any file type associations on the end user device to the application, or any other similar operations to prevent future communications with the virtual node. Additionally, at application service 620, the application service may deallocate the virtual node to the end user device, permitting the virtual node to be allocated to a new end user device. In some implementations, this deallocation may include putting the application into an idle state and reverting the application to a version prior to the operations of the user at end user device 610.

Figure 7:
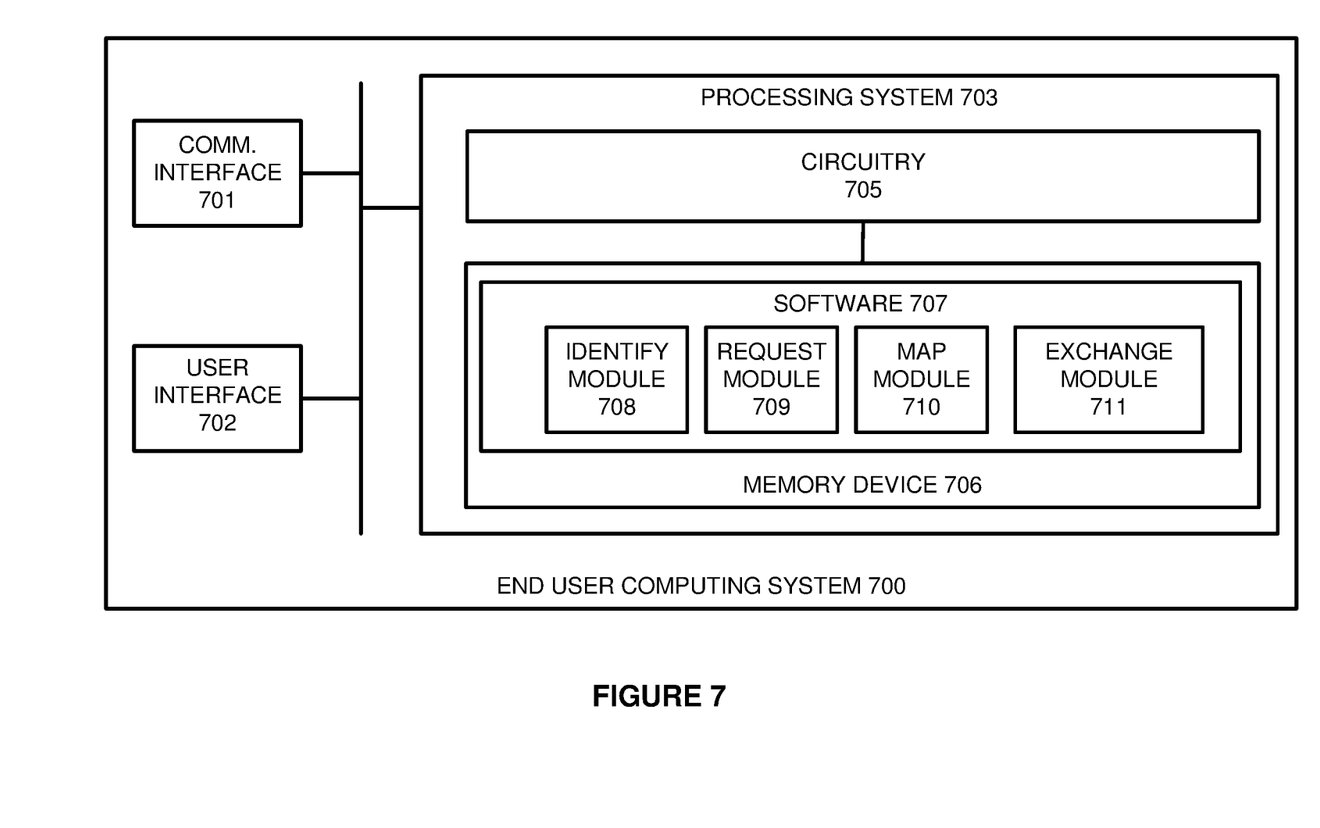
FIG. 7 illustrates an end user computing system according to an implementation.

FIG. 7 illustrates an end user computing system 700 according to an implementation. Computing system 700 is representative of any computing system or systems with which the various operational architectures, processes, scenarios, and sequences disclosed herein for an end user device may be implemented. Computing system 700 is an example of end user device 110 and end user device 610, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a smartphone, tablet computer, a desktop computer, a laptop computer, or some other user computing apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. Communication interface 701 is configured to communicate with an application service to provide remote connections to applications executing in the application service.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. In some implementations, user interface 702 may be used to provide a user interface for an application executing via an application service. This may include providing a display of the application, and receiving user input with regard to the application.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes identify module 708, request module 709, map module 710, and exchange module 711, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, identify module 708 directs processing system 703 to identify a file open request for a file at end user computing system 700. This file open request may comprise an open request for a file that is locally stored on computing system 700, or may comprise an open request for a file that may be located on an external server. In response to the request, request module 709 is used to determine whether the file should be opened via a local application on computing system 700 or should be opened via an application in an external application service. This determination may be made based on a security status for the file, which may be determined based on the file type (extension) of the file and/or the source of the file. If the file is to be opened locally, then an application will be identified on the computing system and the file opened accordingly. In contrast if the file is to be opened using the application service, request module 709 directs processing system to 703 to transfer a request using communication interface 701 to the application service.

Once the request is transferred, map module directs processing system 703 to receive information about an allocated virtual node to support the file open request, and map the file to be opened in an application on the virtual node. In some implementations, the application service may include a broker that is used to allocate a virtual node to support the application request. After allocation, the broker may provide access path information to the application in the allocated virtual node. This path information may include an IP address, a port address, a file path to the application on the virtual node, or some other similar path information. Further, the broker may also provide any security information for computing system 700 to access the particular application. Once the file is mapped to the application and opened in the application, exchange module 711 directs processing system 703 to exchange remote connection information for the application, such that a user of computing system 700 is provided with an interface for the application. This remote connection information may be used to provide a display of the application on computing system 700, as well as receive user input to interface with the remote application. In some examples, the remote connection information may be used to make the application executing in the application service appear as though the application is executing locally on the computing system, however, it should be understood that a remote session window may also be used to indicate to the user that the application is executing via the application service.

In some implementations, in mapping the file associated with the file open request to the application of the application service, map module 710 may further direct processing system 703 to provide FTA with other similar files on the computing system. These similar files may be defined based on the file type and/or the source of the file, such that similar files may be opened using the same application.

Figure 8:
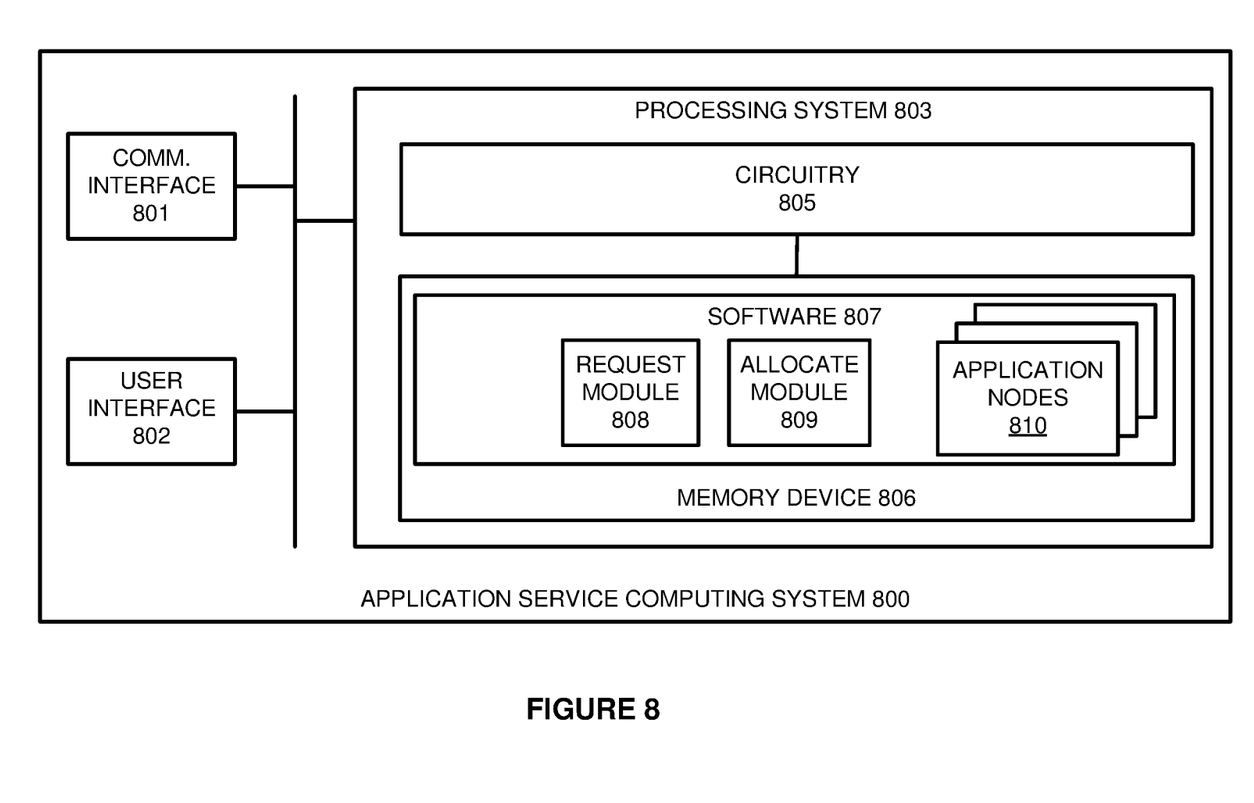
FIG. 8 illustrates an application service computing system according to an implementation.

FIG. 8 illustrates an application service computing system 800 according to an implementation. Computing system 800 is representative of any computing system or systems with which the various operational architectures, processes, scenarios, and sequences disclosed herein for an application service may be implemented. Computing system 800 is an example of application service 120 and 620, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity. Computing system 800 may comprise one or more serving computing systems, desktop computing systems, or any other similar computing systems capable of providing the remote application services as described herein.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. Communication interface 801 is configured to communicate with one or more end user devices to provide the devices with remote sessions to applications operating as virtual nodes.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes request module 808, allocate module 809, and application nodes 810, although any number of software modules may provide the same operation. Application nodes 810 are representative of containers or full operating system virtual machines with a particular application to service the end user device. Operating software 807 may further include an operating system, utilities, drivers, network interfaces, applications, or some other type of software. When executed by processing circuitry 805, operating software 807 directs processing system 803 to operate computing system 800 as described herein.

In at least one implementation, request module 808 directs processing system 803 to receive a request from an end user device to provide a remote application for the end user device, wherein the request occurs based on a security status of a file associated with a file open request on the end user device. In some examples, the request may expressly indicate the required application that is required for the device, however, in other examples the request may indicate a file type that is to be opened on the end user device. When the request indicates a file type, request module 808 may direct processing system 803 to identify an application that supports the defined file type. Once the application request is identified with a required application, allocate module 809 directs processing system 803 to allocate an application node (virtual node) in application nodes 810 to provide the required application. In some implementations in allocating the application node, allocate module 809 may initiate a new application node to support the request. In other implementations, allocate module 809 may identify an idle application node to support the request.

Once the node is allocated, allocate module 809 may further provide the end user device with a remote connection to the allocated virtual node. To provide the remote connection, allocate module 809 may provide access path information to the application operating on the virtual node, wherein the access path information may include addressing and file path information for the application on the application node. Once provided, the end user device may transfer the file to the application service computing system to be opened in the remote application. Once opened, the end user device may exchange remote connection information and data with the appropriate application node, wherein the remote connection information may permit the application to be remotely displayed on the end user device, and provide user input for operations with respect to the application.

In some implementations, when the file open request occurs for a local file on the end user device, the end user device may direct and transfer at least a portion of the file from the end user device to the corresponding path (IP address, directory, and the like) for the application on the application node, wherein the application node may provide the path for opening the file. In other implementations, when the file open request occurs for file on a file server or some other serving device, the end user device may direct the file to be transferred from the server to the application on the application node, wherein the application node may provide the path for opening the required file. In some examples, the file may be transferred directly from the serving device to the application node, however, it should be understood that in some examples the end user device may be an intermediary in the communication of the file to the serving device.

Returning to the elements of computing environment, end user device 110 can be subscriber equipment, customer equipment, access terminal, smartphone, personal digital assistant (PDA), computer, tablet computing device, e-book, Internet appliance, media player, game console, or some other user communication apparatus capable of exchanging a remote desktop connection. End user device 110 can include communication interfaces, network interfaces, processing systems, computer systems, microprocessors, storage systems, storage media, or some other processing devices or software systems.

Application service 120 can include communication interfaces, network interfaces, processing systems, computer systems, microprocessors, storage systems, storage media, or some other processing devices or software systems, and can be distributed among multiple devices. Examples of application service 120 can include software such as an operating system, logs, databases, utilities, drivers, networking software, and other software stored on a computer-readable medium. Application service 120 may comprise, in some examples, one or more server computing systems, desktop computing systems, laptop computing systems, or any other computing system, including combinations thereof. In some implementations, application service 120 may provide virtual nodes 141-143 as full operating systems, however, due to inefficiencies of virtual machines, virtual nodes 141-143 may comprise containers that can be allocated to end users.

Communication link 170 can use metal, glass, optical, air, space, or some other material as the transport media. Communication link 170 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 170 can be a direct link or can include intermediate networks, systems, or devices, and can include a logical network link transported over multiple physical links. Although one main link for communication link 170 is shown in FIG. 1, it should be understood that link 170 is merely illustrative to show communication modes or access pathways. In other examples, further links can be shown, with portions of the further links shared and used for different communication sessions or different content types, among other configurations. Communication link 170 can include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions. Although illustrated in the example of FIG. 1 with a single device communicating with application service 120, it should be understood that any number of end user devices may use application service 120 to provide secure remote applications.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing remote applications based on file open requests, the method comprising:
   in an application service, receiving, over a network, an application request from an end user device to support a file open request on the end user device, wherein the application request occurs based on a security status of a file associated with the file open request, wherein the security status is based at least on a storage location of the file relative to the end user device and a file type of the file, and wherein the application request comprises a file type identifier indicating the file type associated with the file open request;
   identifying an application required to support the application request based on the file type identifier;
   allocating a virtual node with the application to the end user device to support the application request;

providing a remote connection for the application to the end user device; and opening the file associated with the file open request in the application of the virtual node.

2. The method of claim 1 wherein the virtual node comprises one of a container or a virtual machine.

3. The method of claim 1 wherein allocating the virtual node with the application to the end user device to support the request comprises initiating a new virtual node with the application to support the application request.

4. The method of claim 1 wherein allocating the virtual node with the application to the end user device to support the request comprising allocating an idle virtual node with the application to the end user device to support the application request.

5. A computer apparatus comprising:

one or more computer readable storage media;

a processing system operatively coupled with the one or more computer readable storage media; and program instructions stored on the one or more computer readable storage media to provide remote applications to end user devices that, when read and executed by the processing system, direct the processing system to:

receive an application request from an end user device to support a file open request on the end user device, wherein the application request occurs based on a security status of a file associated with the file open request, wherein the security status is based at least on a storage location of the file relative to the end user device and a file type of the file, and wherein the application request comprises a file type identifier indicating the file type associated with the file open request;

identify an application required to support the application request based on the file type identifier;

allocate a virtual node with the application to the end user device to support the application request;

provide a remote connection for the application to the end user device; and open the file associated with the file open request in the application of the virtual node.

6. The computer apparatus of claim 5 wherein the virtual node comprises one of a container or a virtual machine.

7. The computer apparatus of claim 5 wherein the program instructions to allocate the virtual node with the application to the end user device to support the request direct the processing system to initiate a new virtual node with the application to support the application request.

8. The computer apparatus of claim 5 wherein the program instructions to allocate the virtual node with the application to the end user device to support the request direct the processing system to allocate an idle virtual node with the application to the end user device to support the request.

9. A computer apparatus comprising:

one or more computer readable storage media;

a processing system operatively coupled with the one or more computer readable storage media; and program instructions stored on the one or more computer readable storage media to handle file open requests on an end user device that, when read and executed by the processing system, direct the processing system to:

identify a file open request for a file on the end user device;

identify a source of the file, wherein the source of the file comprises a storage location of the file relative to the end user device;

determine whether the file open request requires a remote application from an application service based on the source of the file and a file type for the file;

if the file open request requires a remote application, transfer an application request to the application service and receive a remote connection for an application executing in a virtual node of the application service to support the file open request, wherein the application request comprises a file type identifier indicating the file type associated with the file open request.

10. The computing apparatus of claim 9 wherein the application request comprises an application identifier indicating the application required to support the file open request.

11. The computing apparatus of claim 9 wherein the virtual node comprises a container or a virtual machine.

12. The computing apparatus of claim 9 wherein the program instructions to determine whether the file open request requires a remote application from the application service based on the source of the file direct the processing system determine whether the file open request requires a remote application from the application service based on whether the source of the file comprises an internet source or an untrusted source.

13. The computing apparatus of claim 9 wherein the program instructions direct the processing system to, if the file open request does not require a remote application, execute an application installed locally on the end user device to support the file open request.

* * * * *